Inventor:
Ferdy Mayer
By: Spencer & Kaye
ATTORNEYS

Inventor:
Ferdy Mayer
By: Spencer & Kaye
ATTORNEYS

Inventor:
Ferdy Mayer
By: Spencer & Kaye
ATTORNEYS

Inventor:
Ferdy Mayer
By: Spencer & Kaye
ATTORNEYS

United States Patent Office 3,427,898
Patented Feb. 18, 1969

3,427,898
PRODUCTION OF LOW VELOCITY MOTION
Ferdy Mayer, 22 Rue Ampere, Grenoble, France
Filed May 19, 1964, Ser. No. 368,600
Claims priority, application France, May 20, 1963,
4,578; Sept. 29, 1963, 4,629
U.S. Cl. 74—640       8 Claims
Int. Cl. F16j 15/50; F16h 35/00; H02k 7/06

ABSTRACT OF THE DISCLOSURE

An arrangement for producing low velocity motion between a flexible, nonextensible motion transmitting member and a rigid driven member having, in the direction of relative motion, a surface extent which is different from that of the corresponding flexible member surface, relative motion being produced by rolling at least one rolling element in such direction along the flexible member so as to press the flexible member against the driven member at least one point which moves in such direction without permiting any slip to occur between the flexible and driven members.

---

The present invention relates to the generation of mechanical movement and more particularly to novel speed reduction techniques for generating low mechanical speeds.

Devices capable of producing continuous low-speed motion, particularly of the rotary type, find wide application in many fields. These devices perform their intended function relatively well but they have in common the shortcomings that their speed reduction mechanisms are relatively massive and are composed of many interrelated parts. This results in an inefficient transmission of power since considerable energy must be expended to overcome inertia and friction. Moreover, these devices are all conceived so that there must be direct physical contact, through a train of motion transmitting means, between the driving element and the driven element. Such a requirement renders these mechanisms incapable of being used in situations where the driving means must be in contact with one environment, i.e., a radioactive or other type of impelling fluid or gas, and the driven means must be in contact with a different environment, i.e., the air or a vacuum.

It is therefore an object of the present invention to produce low velocity motion utilizing power transfer means which are light and simple.

It is another object of this invention to produce low velocity motion while impermeably isolating the driving means from the driven means.

It is still another object of this invention to produce low velocity motion by means of a higher velocity element driving a light and simple speed reducing device.

Yet another object of this invention is to cause a high speed motion to produce a low speed motion through the intermediary of an element which impermeably separates the high speed driving means from the low speed driven means.

It is a further object of this invention to cause the energy of a high speed motion to produce a low speed motion utilizing means which permit no slippage between adjacent elements.

These and other objects, principles, and advantages of the present invention will become more readily apparent from the following description when taken together with the accompanying drawings, in which:

FIG. 1b is a longitudinal cross sectional view of the embodiment of FIG. 1a;

Figure 11:
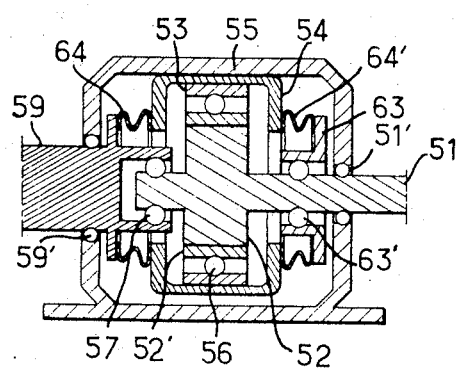
FIG. 11 is a longitudinal cross sectional view of yet another modification of the present invention.
Figure 14A:
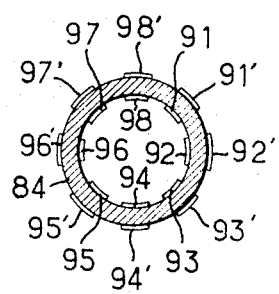
Figure 12:
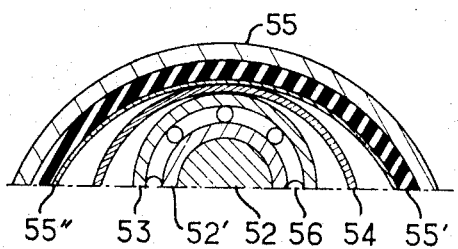
Figure 14B:
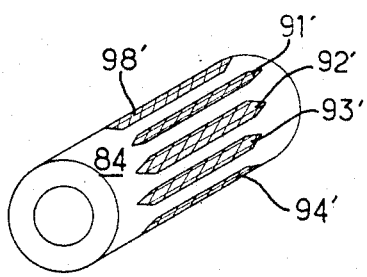
Figure 13:
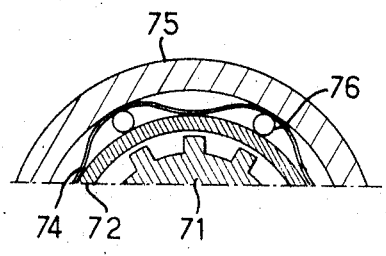

FIG. 12 a partial axial cross sectional view of a variation of the embodiment of FIG. 11;

FIG. 13 is a partial axial cross sectional view of still another electric motor incorporating an embodiment of the present invention;

FIG. 14a is an axial cross sectional view of one embodiment of a flexible cylinder according to the present invention;

FIG. 14b is a perspective view of the structure of FIG. 14a; and

Figure 14C:
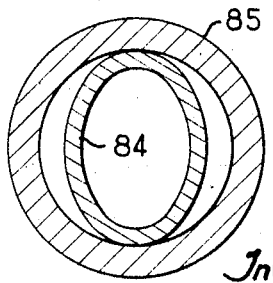

FIG. 14c is an axial cross sectional view of a speed reducer according to the present invention incorporating the device of FIGS. 14a and 14b.

Figure 1A:
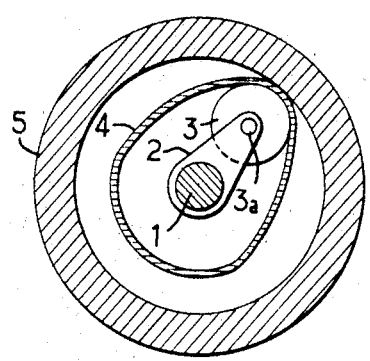
FIG. 1a is an axial cross sectional view of one embodiment of a rotary speed reducing system according to the present invention.
Figure 1B:
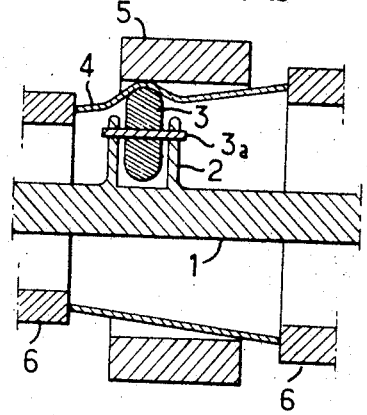

FIGS. 1a and 1b show the basic structure used for translating a high speed, such as the rotation of shaft 1, into the low speed of rotation of annular member 5. The speed reduction is carried out through the intermediary of a rotating connecting rod 2 rigidly mounted for rotation with shaft 1. On the outer end of rod 2 there is mounted a roller wheel 3 comprising an axial shaft 3a which is supported on the rod for free rotation with respect thereto. The rolling wheel 3 applies a pressure to a flexible cylinder 4 for maintaining the latter in contact with the inner circumference of a driven member 5, here shown as an annular element. The pressure applied by wheel 3 is sufficient to prevent any slippage between elements 4 and 5. The driven member 5 may be supported in any desired manner, such as by roller bearings supporting its outer wall at the bottom thereof (not shown) or by longitudinal extensions connected to a shaft (also not shown) coaxial with shaft 1.

As is shown in FIG. 1b, the flexible cylinder 4 is rigidly connected to stationary support members so that it cannot rotate. This cylinder may be made from any flexible material which has the properties of being deformable but relatively inextensible. Moreover, the material must have a sufficiently high coefficient of friction to prevent any slippage between itself and both the wheel 3 and the surface of element 5. Flexible metals, such as sheet steel, may be used as well as suitable plastics, e.g., polystyrenes, and rubber which has been combined with some other material, e.g., rayon cord, in order to render it relatively inextensible.

When no pressure is being applied to cylinder 4, it assumes a cylindrical cross sectional configuration, as viewed along the axis of rotation of shaft 1, having a circumference $l$ at the point where wheel 3 will make contact. When wheel 3 is applied against cylinder 4, its cross section becomes deformed and assumes the unsymmetrical ovoid shape shown in FIG. 1a. However, because this cylinder is relatively inextensible its circumference at the point of contact remains substantially equal to $l$.

As the rod 2 rotates about the axis of shaft 1, the wheel 3 rolls around the circumference of cylinder 4, causing the contact point between the cylinder and the inner circumference of shaft 5 to travel around the latter, the cylinder 4, itself, not rotating. There is thus produced, in effect, a bulge in cylinder 4 which travels around the periphery of the cylinder in unison with the rotation of rod 2.

When the rod 2 completes one revolution, the wheel 3 will have traveled a distance $l$ around cylinder 4. Therefore, the point of contact between cylinder 4 and element 5 will have also traveled a distance $l$ along the inner periphery of the latter, assuming a negligible thickness for cylinder 4. However, element 5 has an inner periphery $L$ which is clearly greater than $l$. Therefore, since there is no slippage between cylinder 4 and element 5, it is necessary that the latter rotate by an amount equal to $L-l$ in order that its point of contact with cylinder 4 have travelled, in space, a distance L, and thus have made one full revolution along with the point of contact.

Figure 1C:
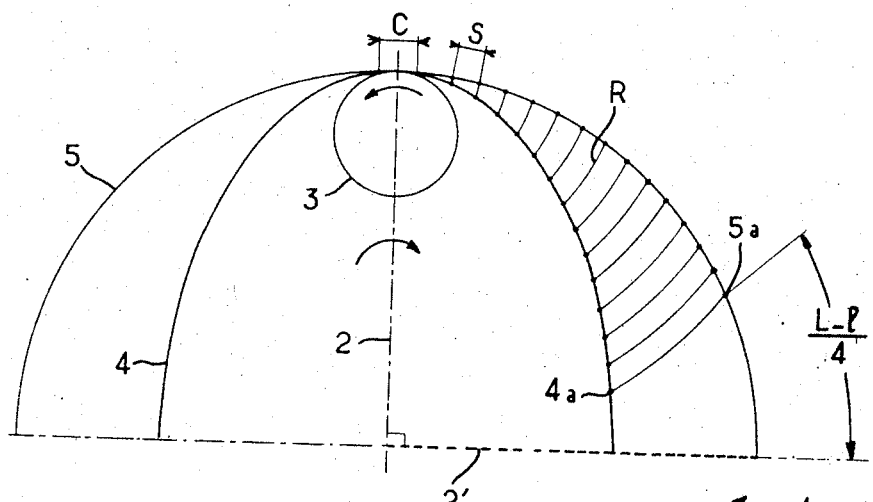
FIG. 1c is a diagram illustrating the manner in which rotation is produced in the device of FIGS. 1a and 1b.

The mechanism by which this rotation is induced in element 5 can perhaps be better understood from an examination of FIG. 1c which shows, in semischematic form, a portion of cylinder 4 and the inner periphery of element 5. As is indicated in the figure, the contact between the two surfaces actually exists over a small area C rather than at a single point. As the rod 2 rotates, in the direction of the arrow superimposed thereon, the region of contact C will move in a clockwise direction. A careful consideration of the effect of this movement on the incremental segments of cylinder 4 should reveal that this clockwise movement of the bulge in cylinder 4 will cause those segments in the region C to be pulled slightly to the right. This slight movement will be transmitted to element 5. Moreover, since there is no slippage between cylinder 4 and element 5, each segment on the former will make contact with a corresponding equal length segment on the latter. This is indicated in the figure by the lines R which join successive pairs of points on the two members, the point, such as 4a, being the same distance from the center of region C, along the circumference of cylinder 4, as is the corresponding point, such as 5a, along the circumference of element 5. It must therefore result that, as the rod 2 rotates, each successive pair of joined points on the two members will in turn make contact. The length of the segment of cylinder 4 between the center of region C and point 4a has been chosen so as to equal $l/4$. Because of the distortion of cylinder 4, this point is somewhat angularly displaced from the radial line 2' which is perpendicular to the rod 2. However, when the rod 2 rotates to the position 2', the wheel 3 must make contact with this point 4a since this point is one-fourth of the circumference of cylinder 4 away from the center of region C. Likewise, point 4a must make contact with point 5a, because of the considerations discussed above. The only way in which all these conditions may be fulfilled, while avoiding slippage, is if the element 5 is permitted to rotate by an amount equal to $L-l/4$, thus bringing point 5a in contact with point 4a along radial line 2'.

It should be obvious from the above discussion that the relation of the rate of rotation of shafe 1 and element 5 may be very accurately determined by the relation between the inner circumference of the latter and the circumference, at the point of contact, of cylinder 4. This relation is thus proportional to $L-l/l$, and the speed of the driven element may be reduced by reducing the difference between the two circumferences. In the practice of the present invention, it is foreseen that this difference vary between 10% and 0.01% of the circumference of cylinder 4, thus yielding speed reductions of between $10^{-1}$ and $10^{-4}$.

One technique for varying the speed reductions in a single unit is shown in FIG. 1b wherein cylinder 4 has a frustoconical shape which permits an axial translation of rod 2 to vary the effective circumference of the active portion of the cylinder and thus the difference $L-l$.

Figure 2:
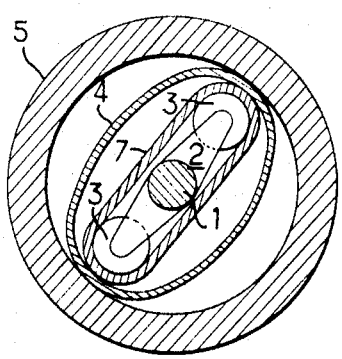
FIGS. 2 and 3 are axial cross sectional views showing modifications of the embodiment of FIG. 1 in which two points of contact are employed.

FIG. 2 shows a modification of the embodiment of FIG. 1a in which the single wheel is replaced by a pair of diametrically opposed wheels 3 which serve to double the bearing surface between cylinder 4 and element 5, thus increasing the torque applied to the latter. Moreover, the use of a pair of diametrically opposed bearing surfaces permits the system to be placed in dynamic equilibrium while the elliptical shape given the cylinder 4 reduces the degree of distortion which it will experience and hence increases its service life. Finally, the device of FIG. 2 includes a band of some flexible material having a high coefficient of friction, such as rubber, which serves to increase the bearing surface, at each point of contact, between the cylinder 4 and element 5.

Figure 3:
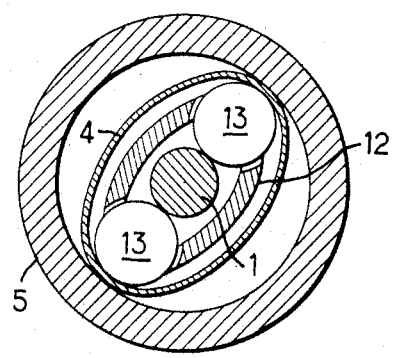

FIG. 3 shows another modification of the basic device in which the rod 2 and wheel 3 of FIG. 1a are replaced by balls or cylinders 13 whose size are such that they are driven directly by a rolling contact with shaft 1. A guide frame 12 is provided for maintaining the position of members 13 while permitting them to rotate freely. The embodiment of FIG. 3 could equally well use three or more equally spaced members 13 to permit a still better contact between the flexible cylinder and the driven element.

Figure 4:
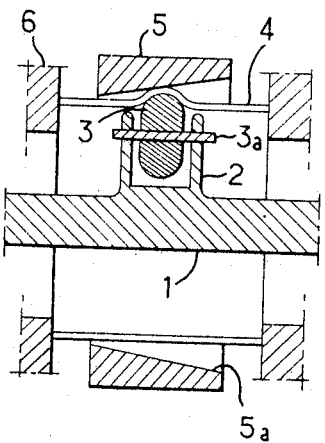
FIG. 4 is a longitudinal cross sectional view showing a modification of the arrangement illustrated in FIG. 1b.

FIG. 4 illustrates a modification of the device of FIG. 1 in which the driven member 5 is provided with a frustoconical bearing surface 5a to enable the speed relation between shaft 1 and the driven member to be varied by shifting the longitudinal position of the driven member. When this form of speed relation variation is used, some means must be provided to vary the radial position of shaft 3a in order to assure a good contact between cylinder 4 and member 5 for all positions of the latter.

Figure 5:
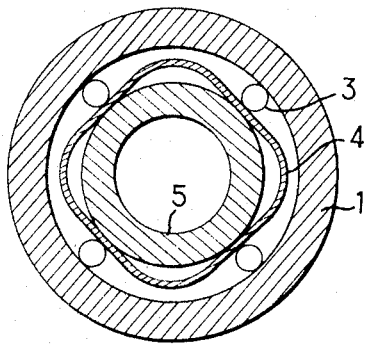
FIG. 5 is an axial cross sectional view showing a further embodiment of the present invention.

The principle of the present invention can be equally well applied to cause an external driving member to induce low speed rotation in an internally positioned driven member. Such an arangement is shown in FIG. 5, wherein an annular driving member 1, driven, for example by an axial shaft (not shown) located behind the plane of the drawing, drives a series of freely rotatable wheels 3 around the periphery of flexible cylinder 4. As in the previously described embodiments, the flexible cylinder 4 is rigidly connected to a stationary body so that it does not rotate. The wheels 3 may be connected to one another by any suitable framework which will maintain them in their positions with respect to one another while permitting each of them to freely rotate about its axis and around the periphery of cylinder 4. The wheels 3 press cylinder 4 against driven member 5 and the rotation of the resulting points of contact between the cylinder and the driven member causes the latter to rotate, this time in the inverse sense with respect to the rotation of member 1, due to the same effect as that described in connection with FIGS. 1-4. It should be noted that because the driven member is being supported at four equidistant points, it does not require any additional support means. In a like manner, if three or more balls or wheels were employed in the devices of FIG. 2 or 3, the driven member 5 would require no additional support means.

Figure 6:
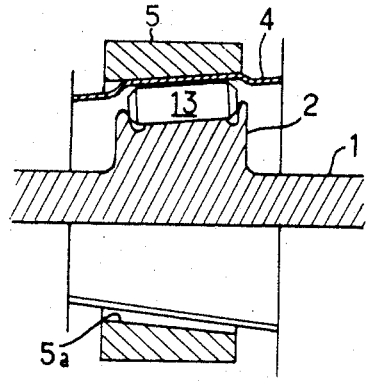
FIG. 6 is a longitudinal cross sectional view of a further modification of the arrangement shown in FIG. 1b.

FIG. 6 illustrates a modification of the basic device of FIG. 1 in which a cylindrical roller bearing 13 is used, instead of the wheels 3, in order to provide a larger contact surface between cylinder 4 and driven member 5.

The roller bearing is free to rotate in its seating 2, and is held therein by cylinder 4. Both the bearing surface 5a of member 5 and the wall of cylinder 4 have frustoconical surfaces, the apical angle of one differing slightly from that of the other in order to permit a slight speed relation variation by means of a shifting of the longitudinal position of either member 5 or shaft 1.

Figure 7:
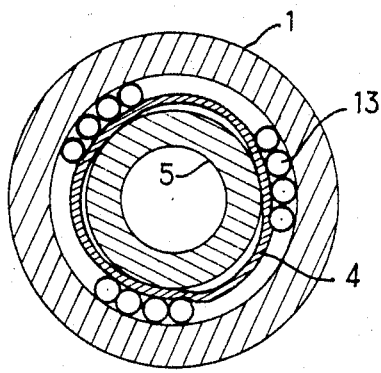
FIG. 7 is an axial cross-sectional view showing a modification of the embodiment of FIG. 5.

FIG. 7 shows a modification of the device of FIG. 5 in which a plurality of roller bearings 13 are provided between external driving member 1 and driven member 5 in order to improve the contact against the latter and also to provide a better support therefor. As in the FIG. 5 embodiment, all of the bearings 13 may be mounted on a suitable framework, connected to their ends, in order to maintain their relative positions.

Figure 8:
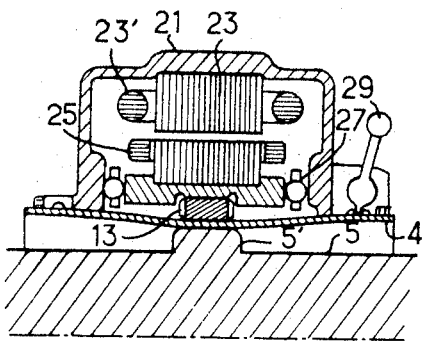
FIG. 8 is an axial cross sectional view of an electric motor incorporating a speed reducer according to the present invention.

FIG. 8 shows a longitudinal cross sectional view of the upper half of an asynchronous motor used for driving a central shaft 5. In this embodiment an annular stator member 23 is mounted on a stationary housing 21 and carries exciting windings 23'. Concentrically therewith is mounted a rotor member 25, the windings of which may be of the squirrel-cage type. The rotor is guided by ball bearings 27 for rotation about a horizontal axis lying in the plane of the figure and is supported by roller bearings 13, of which there may be any desired number, for rotation about flexible cylinder 4. The rotation of bearings 13 about cylinder 4 provokes the rotation of shaft 5 in a manner analogous to that described in connection with the preceding embodiments. Shaft 5 is provided with a circumferential ridge 5' upon which cylinder 4 bears. The cylinder 4 is rigidly connected to housing 21, which prevents its rotation, and is furnished with a tension adjusting lever 29 which determines the amount of play present in cylinder 4 and hence the bearing pressure against ridge 5'.

Figure 9A:
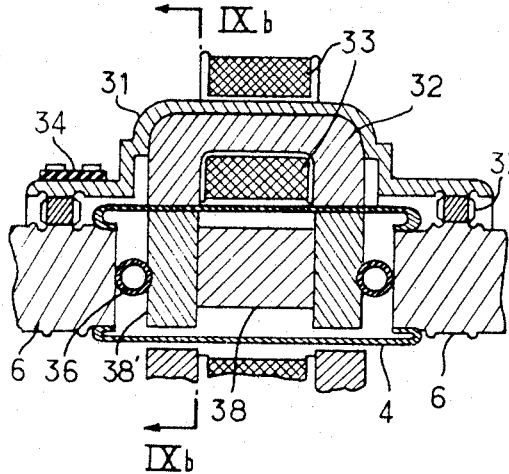
FIGS. 9a and 9b are, respectively, a longitudinal and an axial cross sectional view of a second type of electric motor incorporating a speed reducer according to the present invention.
Figure 9B:
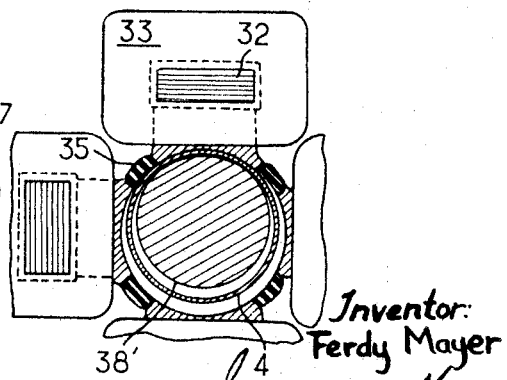

FIGS. 9a and 9b show, respectively, a longitudinal cross sectional view and an axial cross sectional view of a speed reduction device conforming to a further variation of the concept of the present invention. In this embodiment the flexible cylinder 4 is rigidly mounted between a pair of axially aligned, stationary supports 6. The stator 32–33 of an electric motor is mounted exteriorly of cylinder 4, the mounting being effected by means of a rigid attachment to housing 31, the latter being in turn mounted for rotation about supports 6 by means of roller bearings 37. The roller bearings 37 are mounted so as to rotate freely in their housings (not fully shown) on supports 6 but are prevented from rotating around these supports. The motor rotor is provided with a permanent magnet 38, having axially displaced poles, and a pair of integrally connected cylinder bearing members 38'. The rotor is guided by bearings 36 which merely restrict its longitudinal movement and which permit it to roll, without slippage, around the inner periphery of cylinder 4. As is shown in FIG. 9b, which represents a cross sectional view taken along line IXb—IXb of FIG. 9a, the motor stator is comprised of a plurality of pairs of diametrically opposed poles with each pole being electrically isolated from adjacent ones by means of insulating strips 35. Two pairs of poles are shown in this embodiment, but any desired number may be used. Adjacent poles are fed in quadrature and opposite poles in phase opposition so that the assembly acts as a repulsion device with the rotor describing an epicycloidal motion around the inner periphery of the stator assembly. The stator is supplied by means of circumferential slip rings 34, one pair of which are shown, mounted on housing 31.

In operation, the application of signals to stator windings 33 produces a rotating magnetic field which causes rotor 38–38' to roll around the inner surface of cylinder 4, thus causing the point of contact between the latter and the inner periphery of the stator to rotate. Because of the dissimilarity between the circumference of cylinder 4 and that of the inner periphery of the stator, this rotating point of contact induces a low speed rotation of the stator assembly around supports 6, in a manner similar to that described in connection with FIG. 1. A low speed rotation is thus achieved with a minimum of moving parts and with a mechanical compactness which results in very small air gaps in the various magnetic circuits.

Figure 10:
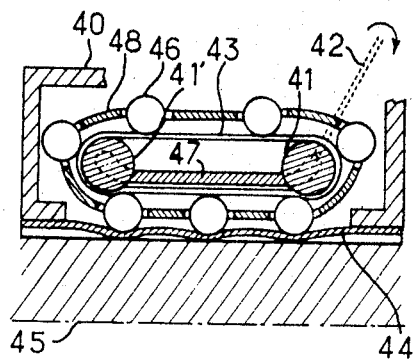
FIG. 10 is a cross sectional view of still another modification of the present invention used for producing linear motion.

Turning now to FIG. 10, there is shown a variation of the present invention which can be employed to produce low speed linear motion. In this embodiment, a stationary housing 40 is provided to which is attached a flexible sheet 44, the sheet representing, in material and function, an unrolled version of cylinder 4. A driving unit is comprised of a rigid, stationary support 47 upon which are rotatably mounted a pair of wheels, or roller bearings, 41, 41' one of which is driven by a shaft 42. The driven wheel 41 drives the other wheel 41' and a flexible belt 43. The belt 43 in turn induces rotation in bearings 46, causing them to roll over the surface of sheet 44. The bearings 46 are rotatably held in a flexible band 48 which forms an endless train of rotating elements each of which rolls in turn over sheet 44. The latter bears against driven member 45 at a plurality of points each of which moves to the left as the bearings 46 roll along the surface of sheet 44. The driven member is supported from the bottom by any suitable rotating means (not shown), such as ball or roller bearings, which will permit it to move freely in the horizontal plane. Because of the fact that the sheet 44 has a greater length than the extent of the bearing surface of element 45 over which it passes, the constantly advancing points of contact between the two members induces a horizontal movement to the right in member 45. The mechanism by which this motion is produced is identical with that of the previously described rotating devices and, in fact, can be visualized as representing nothing more than an unrolled version of these preceding devices.

FIG. 11 shows still another form which the present may take. In this embodiment, the solid outer member 55 is stationary and comprises the support frame for the device while the flexible wall 54 is caused to roll around the circumference of member 55 and thus constitutes th low speed rotating element. The theory of operation of this device is thus identical with that of the previously described embodiments, the same relative motion existing between the solid annular member 55 and the flexible cylinder 54 but the roles of fixed member and rotating member being interchanged.

In this embodiment driving power is supplied by input shaft 51 mounted on bearings 51' for free rotation with respect to frame 55. Shaft 51 carries a rigidly connected rotatable cam, or eccentric, 52, which may be integral with the shaft or merely fastened thereto by a key or other appropriate means. The cam 52, which may be in the form of an ovoid or a thick rod having a rounded end, or of any other suitable eccentric shape, is provided with a rigidly attached circumferential member 52' which serves as the inner race for ball bearings 56. The outer race for these bearings is constituted by a flexible strip 53 which bears against flexible cylinder 54, causing this cylinder to, in turn, bear against the inner circumference of housing 55. As the shaft 51 rotates, causing cam 52 to rotate, the point of contact between flexible cylinder 54 and both housing 55 and strip 53 rotates around the circumference of the housing, with no slip existing between either pair of bearing surfaces. Because the circumference of cylinder 54 is less than that of housing 55, this rotation of the point of contact induces a low speed rotation, in the opposite sense, of cylinder 54. This rotation is transmitted by radially flexible diaphragm 64 to output shaft 59, diaphragm 64 being rigidly attached at one end to cylinder 54 and at the other end to an abutment of shaft 59 and being radially flexible so as to follow the radial deformations of cylinder 54. Shaft 59 is mounted on ball bearings 59' for free rotation with respect to housing 55 and on ball bearings 57 to permit free rotation between shaft 51 and shaft 59 and to provide an additional support for both shafts. In order to maintain the cylinder 54 in alignment, an additional diaphragm 64' is provided on the other side of cylinder 54. This diaphragm is attached to an abutment of annular member 63 and the member 63 is mounted on ball bearings 63' for free rotation with respect to shaft 51. The diaphragms 64, 64' can be constituted by any well-known type of flexible joint such as those of the Cardau or Oldham type.

FIG. 12 shows an axial cross sectional view of the upper portion of a device which is identical with the embodiment of FIG. 11 with the exception that the inner circumference of housing 55 is provided with a layer 55' of rubber, or other elastically compressible material, and a covering sheet of flexible metal 55''. With this modification, the bearing pressure of cylinder 54 causes the rubber layer 55' to compress, thus increasing the contact area between the cylinder and sheet 55''. This arrangement, which can be equally well applied to the other embodiemnts described herein, permits greater torques to be transmitted to the output of the device.

FIG. 13 shows a further embodiment of the principle of the present invention wherein the speed reducer is incorporated directly in the structure of an electric motor. In this embodiment there is provided a central stator 71, which is here shown to be of the salient pole type but which may be of any other type capable of inducing rotation in a squirrel-cage type rotor. Surrounding stator 71 is a rotor 72 which constitutes the driving element for the speed reducer and which is formed of a solid piece or of a series of closely associated bars to form a squirrel-cage element. A series of ball or roller bearings 76 are disposed around the periphery of rotor 72 so as to be rolled by the rotation of the rotor. These bearings may be maintained in their relative positions with respect to one another by any suitable frame similar to those described in connection with FIG. 5. Each bearing 76 bears against a respective point on flexible cylinder 74, each point of contact being rotated around the inner periphery of driven member 75 by the rotor 72.

The cylinder 74 is restrained from rotation by attachment to stationary supports (not shown) so that the rotation of the points of contact between cylinder 74 and element 75 induces a low speed rotation in the latter in a manner similar to that described in connection with the preceding embodiments. This embodiment is of great value because the driving mass is very small, and thus has a low inertia and because the entire unit can be made toroidal in form by merely making the center of stator 71 hollow.

FIGS. 14a, 14b and 14c show a particularly interesting variant of the present invention in which only one rotating element, the low speed driven member, is present. This device employs the property of certain materials, called piezoelectric or ferroelectric, of contracting or expanding under the influence of an electric field.

FIG. 14a shows a flexible cylinder 84 constructed to function according to this principle so as to produce an action analogous to that performed by the flexible cylinder 4 of FIGS. 2 and 3. This cylinder may be made from any suitable piezoelectric or polarized ferroelectric material, such as barium titanate, and carries attached pairs of electrodes 91–91', . . . 98–98'.

An A.C. signal is applied across each pair of electrodes, with the same frequency being applied to all of them but with the signal to each being shifted in phase with respect to the signal on the preceding pair of electrodes in such a way that the elongation or contraction induced by the signal across each pair of electrodes varies progressively around the periphery of the cylinder, causing it to assume a shape similar to that shown in FIG. 14c. As the signal across each pair of electrodes alternates in time, the orientation of the ellipse travels around the cylinder in space. It should be understood that the distortion shown in FIG. 14c is greatly exaggerated for purposes of clarity and that in practice the diameter of the cylinder 84 does not vary by more than a factor of $10^{-3}$ or $10^{-4}$.

The amplitude and polarity of the voltage between each pair of electrodes will determine the degree and direction of radial deformation of the portion of cylinder 84 disposed between that pair of electrodes. Thus, for example, the application between a given pair of electrodes of a voltage having a first polarity will produce a radial expansion of the associated portion of cylinder 84, while the application to these electrodes of a voltage having the opposite polarity will produce a radial compression of the associated cylinder portion.

In order to give the cylinder 84 the shape shown in FIG. 14c, it is necessary that the same voltage amplitude and polarity be applied to diametrically opposed pairs of electrodes. Thus, for example, if a maximum voltage having a first polarity is applied between electrodes 98 and 98', a voltage having the same amplitude and polarity will be applied between electrodes 94 and 94'. At the same time, a maximum voltage having the opposite polarity will be applied between electrodes 92 and 92', as well as between electrodes 96 and 96'. At this instant, the voltages across the remaining pairs of electrodes, i.e., 91–91', 93–93', 95–95', and 97–97', will be zero.

During the next succeeding time interval, corresponding to one-fourth the period of the applied signal, the maximum voltage of the first polarity will be applied between electrodes 91 and 91' and between electrodes 95 and 95', a maximum voltage of the opposite polarity will be applied between electrodes 93 and 93' and between electrodes 97 and 97' and the voltage between electrodes 92–92', 94–94', 96–96', and 98–98' will be equal to zero.

In this manner, the major axis of the elliptical cross section of deformed cylinder 84 will rotate around the axis of the cylinder. Since the cylinder 84 has a smaller circumference than the driven member 85, the circumference of cylinder 84 being substantially invariable, and since the cylinder 84 is prevented from rotating by being attached at its ends to a stationary frame, this rotation of the elliptical configuration of cylinder 84 will induce a low speed rotation in driven member 85, in precisely the same manner that the rotation of the deformation of cylinder 4 in FIG. 1a induces a low speed rotation in the driven member 5 of that figure. The only difference is that it is the direct action of the voltages between the various electrodes which causes successive portions of cylinder 84 to bear against cylinder 85 instead of the rotating action of a wheel 3.

The elliptical deformation of cylinder 84 travels around the circumference thereof at a rate which is proportional to the frequency of the applied signals. The cylinder 84 is prevented from rotation by being attached at its ends to a stationary frame with the result that the rotation of the electric field resulting from the phase shift of the A.C. voltages from one pair of electrodes to the next causes the points of contact between members 84 and 85 to rotate around the periphery of the assembly, thus inducing low speed rotation in driven member 85. Because of the uniform distribution of expanded and contracted segments around cylinder 84, its overall circumference remains constant.

There is thus produced an efficient electrical-to-mechanical energy conversion without the intervention of any sliding surfaces and with a minimum of components.

The embodiments described above are capable of many variations and modifications which would be obvious to one skilled in the art and are therefore not intended to be limitative of the possible forms which the present invention may take, it being understood that the coverage of the present invention should be limited only by the scope of the appended claims.

What I claim is:

1. A device for producing low speed motion comprising:

(a) a flexible motion transmitting member formed from a thin sheet which is substantially nonextensible at least in one direction along its surface;

(b) an inflexible member having a bearing surface, one portion of which surface is adjacent to, and coextensive with, said surface of said motion transmitting member;

(c) wherein, said surfaces are normally oblique to one another in a direction perpendicular to said one direction and, in said one direction, the extent of said portion of said bearing surface is unequal to the extent, in said one direction, of said surface of said flexible member, the amount of this inequality varying in a direction along said surfaces perpendicular to said one direction; and (d) driving means associated with said flexible member for causing at least one point on said flexible member surface to bear against said inflexible member bearing surface and for causing said at least one bearing point to move along said two surfaces in said one direction, thereby producing relative motion between said two surfaces, in said one direction, said driving means including at least one rolling element having a circular cross section and mounted on an axial shaft, and motion producing means connected to said shaft for causing said element to bear against said flexible member so as to urge said flexible member surface against said bearing surface and for driving said shaft to cause said element to roll in said one direction on said flexible member and to describe a constant diameter rolling path, said shaft being axially displaceable relative to at least one of said members in a direction perpendicular to said one direction for displacing the path of contact between said surfaces in a direction perpendicular to said one direction, thereby to change the relative velocity between said two surfaces;

(e) the materials from which said motion transmitting member and said inflexible member are made being chosen so that no slip will exist between said two surfaces at said at least one point of contact.

2. A device as recited in claim 1 wherein said motion transmitting member is formed from a unitary, impermeable sheet.

3. A device as recited in claim 1 in which said inflexible member is in the form of a cylinder and said motion transmitting member is substantially cylindrical in shape and is coaxial with said inflexible member.

4. A device as recited in claim 3 in which said motion transmitting member is disposed within the periphery of said inflexible member.

5. A device as recited in claim 1 wherein each said rolling element is constituted by an axially pivoted wheel.

6. A device as recited in claim 1 wherein each of said rolling elements is constituted by an axially pivoted cylindrical roller.

7. A device as recited in claim 1 further comprising a stationary support to which a pair of ends of said flexible member are immovably attached.

8. A device as recited in claim 1 wherein said inflexible member is made stationary.

References Cited

UNITED STATES PATENTS

| | | | |
|---|---|---|---|
| 2,906,143 | 9/1959 | Musser | 310—83 |
| 3,039,324 | 6/1962 | Waterfield | 74—640 |
| 3,119,283 | 1/1964 | Bentov | 74—640 |
| 3,148,560 | 9/1964 | Woodward | 74—640 |
| 3,169,202 | 2/1965 | Proctor | 310—82 |
| 3,199,370 | 8/1965 | Prior | 74—640 |
| 3,206,703 | 8/1965 | Ferrell | 74—640 |
| 3,211,931 | 10/1965 | Tehon | 310—8.3 |
| 2,943,495 | 7/1960 | Musser | 74—17.8 |
| 3,159,309 | 12/1964 | Stiff | 74—17.8 |

OTHER REFERENCES

Harmonic Drive Principles and Performance, United Shoe Machinery Corporation, 1959, 15 pages.

DONLEY J. STOCKING, *Primary Examiner.*

T. C. PERRY, *Assistant Examiner.*